United States Patent Office 3,117,097
Patented Jan. 7, 1964

3,117,097
MOLYBDENA SUPPORTED CATALYST AND THE METHOD OF ACTIVATING THEREOF
Edward J. Janoski, Philadelphia, Pa., assignor to Sun Oil Company, Philadelphia, Pa., a corporation of New Jersey
No Drawing. Filed Feb. 14, 1958, Ser. No. 715,175
6 Claims. (Cl. 252—465)

This invention relates to a novel catalyst composition useful in promoting reactions such as dehydrogenation and aromatization of paraffinic hydrocarbons, and isomerization.

In the past it has been known that molybdena supported on a support such as silica or alumina is an effective catalyst for promoting such reactions as aromatization of paraffinic hydrocarbons, reforming of gasoline-boiling range petroleum fractions, and isomerization reactions. Such molybdena catalysts are prepared by impregnating the support with a dissociable molybdenum compound in an amount sufficient to yield from about 5% to about 20% $MoO_3$ on the support after the impregnated support is calcined in the presence of oxygen. After calcination the catalyst is activated by heating in the presence of hydrogen at temperatures of from about 450° C. to about 550° C. for a period of from about 4 hours to about 10 hours to reduce the $MoO_3$ to a lower oxidation state. Reduction in this manner sometimes has an adverse effect on the structure of the support and the active component, since sintering may occur, with consequent reduction of the surface area.

I have now discovered that a superior molybdena catalyst may be prepared by reducing the $MoO_3$ by contact with an aluminum alkyl or aryl at room temperature or thereabouts in the absence of oxygen. High temperatures may be used, but do not give improved results over those obtained at room temperature. Aluminum compounds suitable for use in reducing the catalysts have the formula $AlR_2X$ in which R is a hydrocarbon radical, and X may be a hydrocarbon radical or hydrogen. Examples of such compounds include aluminum trimethyl, aluminum triethyl, aluminum triisobutyl, aluminum triphenyl, diethyl aluminum hydride, dimethyl aluminum hydride, and homologues thereof. A prefered method of conducting the reduction is to heat the supported $MoO_3$ catalyst under high vacuum at a temperature of from 200° C. to about 400° C. for a period of from 1 to 4 hours in order to evacuate oxygen and water from the pores of the catalyst. The catalyst is then cooled in vacuo to room temperature and is then contacted with one of the aluminum compounds refered to above dissolved in an inert hydrocarbon solvent in a mol ratio of molybdena to aluminum compound of from about 9:1 to about 1:1. After allowing the catalyst to stand in contact with the aluminum compound for a period of time sufficient to convert the $MoO_3$ to a lower oxidation state, say from about 20 minutes to four hours, the solvent is displaced from the catalyst by an inert gas, and the catalyst is heated at a temperature of from about 250° C. to about 450° C. for a period of time sufficient to destroy any aluminum compound adhering thereto. The catalyst is then ready for use.

In order that those skilled in the art may more fully appreciate the nature of my invention, and a method of carrying it out, the following specific example is given, showing the preparation of a catalyst in accordance with the invention, and the activity of the catalyst so prepared in the aromatization of n-heptane, as compared with the activity of a molybdena catalyst activated by conventional hydrogen reduction.

Example I

Catalyst A was prepared as follows: three volumes of an alumina-supported molybdena catalyst comprising 9% $MoO_3$ was thoroughly mixed with seven volumes of quartz and placed in a tube. The quartz was added to provide a heat fly-wheel to avoid local overheating in the subsequent heptane conversion, and possessed no catalytic activity of its own. The particle size of the solids ranged from 8 to 20 mesh. The tube was then evacuated to 1 mm. pressure absolute and was heated to 400° C. for three hours, after which it was cooled in vacuo to room temperature. The tube was then filled with n-heptane containing 7 grams of aluminum triisobutyl in solution, which was a mol ratio of $MoO_3$ to aluminum triisobutyl of 4.5 to 1. After a four-hour contact time the liquid was displaced from the catalyst by dry nitrogen and the catalyst was heated to 400° C. in a stream of dry nitrogen for one hour in order to destroy any aluminum triisobutyl adhering to the catalyst.

Catalyst B was prepared by heating a duplicate sample of the supported molybdena catalyst and quartz in a hydrogen atmosphere for four hours at 450° C. Both catalysts were then used to catalyze the aromatization of a n-heptane feed at a temperature of 525° C. and at a liquid hourly space velocity (volume of n-heptane/volume of catalyst/hour) of 0.85. Product yields from these runs were as follows:

|  | Mol Percent | | Vol. Percent Liquid Recovery | Wt. Percent | |
| --- | --- | --- | --- | --- | --- |
|  | Aromatics | Olefins |  | Gas | Coke |
| Catalyst A | 23.9 | 2.8 | 90.6 | 4.0 | 3.0 |
| Catalyst B | 19.0 | 2.9 | 89.9 | 3.0 | 3.5 |

As may be observed from the foregoing, activation of the catalyst by reduction with aluminum triisobutyl instead of hydrogen resulted in a catalyst which gave 25% more aromatics and 14% less coke, while the yield of olefins and total liquid recovery were virtually unaffected.

The invention claimed is:
1. A catalyst composition consisting essentially of molybdenum oxide distended on a porous support selected from the group consisting of silica and alumina, the molybdenum oxide comprising from about 5 percent to about 20 percent of the composition, said composition having been prepared by contacting the supported molybdenum oxide in a higher valence state with an aluminum compound having the formula $AlR_2X$ in which R is a hydrocarbon radical having up to six carbon atoms and X is selected from the group consisting of hydrogen and hydrocarbon radicals having up to six carbon atoms and heating the composition to a temperature sufficiently high and for a period sufficiently long to destroy any of said aluminum compound adhering to the composition.

2. The composition according to claim 1 in which the aluminum compound is aluminum triisobutyl.

3. Method of activating a molybdena catalyst which comprises contacting a composition consisting essentially of molybdena in a higher valence state supported on a porous support selected from the group consisting of silica and alumina with an aluminum compound having the formula $AlR_2X$, in which R is a hydrocarbon radical having up to six carbon atoms and X is selected from the group consisting of hydrogen and hydrocarbon radicals having up to six carbon atoms, in the mol ratio of molybdena to aluminum compound of from about 9:1 to about 1:1, for a period of time sufficient to reduce the molybdena to a lower valence state, and thereafter heating the composition to a temperature of from about 250° C. to about 450° C. for a period of time sufficient to destroy any of the aluminum compound remaining on the composition.

4. The method according to claim 3 in which the aluminum compound is aluminum triisobutyl.

5. Method of activating a molybdena catalyst which comprises contacting a composition consisting essentially of molybdena in a higher valence state distended on a porous support selected from the group consisting of silica and alumina with a solution of an aluminum compound having the formula $AlR_2X$, in which R is a hydrocarbon radical having up to six carbon atoms and X is selected from the group consisting of hydrogen and hydrocarbon radicals, having up to six carbon atoms, for a period of time sufficient to reduce the molybdena to a lower valence state, said solution containing the aluminum compound in an amount such that the mol ratio of molybdena to aluminum compound is in the range of 9:1 to 1:1, draining the solution from the composition, and heating the composition to a temperature of from about 250° C. to about 450° C. for a period of time sufficient to destroy any of the aluminum compound adhering to the composition.

6. The method according to claim 5 in which the aluminum compound is aluminum triisobutyl.

References Cited in the file of this patent

UNITED STATES PATENTS

| | | |
|---|---|---|
| 2,691,647 | Field | Oct. 12, 1954 |
| 2,702,288 | Hoeksema et al. | Feb. 15, 1955 |
| 2,726,231 | Field | Dec. 6, 1955 |
| 2,822,357 | Brebner | Feb. 4, 1958 |
| 2,824,089 | Peters et al. | Feb. 18, 1958 |
| 2,936,291 | Peters et al. | May 10, 1960 |
| 2,963,447 | Peters et al. | Dec. 6, 1960 |